United States Patent
Mogul et al.

(10) Patent No.: US 9,652,419 B1
(45) Date of Patent: May 16, 2017

(54) METHOD AND SYSTEM FOR FILTERING FLOW TABLE COUNTERS

(71) Applicant: Google Inc., Mountain View, CA (US)

(72) Inventors: Jeffrey Clifford Mogul, Menlo Park, CA (US); Yuhong Mao, Fremont, CA (US)

(73) Assignee: Google Inc., Mountain View, CA (US)

( * ) Notice: Subject to any disclaimer, the term of this patent is extended or adjusted under 35 U.S.C. 154(b) by 334 days.

(21) Appl. No.: 14/511,622

(22) Filed: Oct. 10, 2014

Related U.S. Application Data

(60) Provisional application No. 62/033,306, filed on Aug. 5, 2014.

(51) Int. Cl.
*G06F 13/28* (2006.01)
*G06F 13/16* (2006.01)

(52) U.S. Cl.
CPC .......... *G06F 13/28* (2013.01); *G06F 13/1673* (2013.01)

(58) Field of Classification Search
None
See application file for complete search history.

(56) References Cited

U.S. PATENT DOCUMENTS

| | | | |
|---|---|---|---|
| 7,106,696 B1 | 9/2006 | Lim et al. | |
| 7,630,309 B1 | 12/2009 | Lim et al. | |
| 7,986,629 B1 | 7/2011 | Ferguson et al. | |
| 8,238,246 B2 | 8/2012 | Ferguson et al. | |
| 8,335,160 B2 | 12/2012 | Carvalho et al. | |
| 8,503,304 B2 | 8/2013 | Ferguson et al. | |
| 2013/0308645 A1* | 11/2013 | Karino | H04L 47/10 370/392 |
| 2013/0318255 A1* | 11/2013 | Karino | H04L 45/00 709/238 |
| 2014/0029427 A1 | 1/2014 | Huici et al. | |

OTHER PUBLICATIONS

Curtis et al., "DevoFlow: Scaling Flow Management for High-Performance Networks", SIGCOMM'11, Aug. 15-19, 2011.

* cited by examiner

*Primary Examiner* — Idriss N Alrobaye
*Assistant Examiner* — Dayton Lewis-Taylor
(74) *Attorney, Agent, or Firm* — McDermott Will & Emery LLP

(57) ABSTRACT

A system, method, and non-transitory computer-readable medium for filtering flow table entries is described. A trusted device may send a table read request to a network interface controller (NIC) that includes predicate logic. The NIC will use the received predicate logic to filter flow table entries. The entries that satisfy the criteria specified by the trusted software are moved to a Direct Memory Access (DMA) buffer on the NIC to create a subset of entries. Once some or all of the flow table has been scanned, the subset of entries may be transferred from the DMA buffer on the NIC to a memory of the trusted host via a DMA transfer to be further processed by the trusted host.

21 Claims, 7 Drawing Sheets

FIG. 3

| Entry | Misc. Columns | # of Packets | # of Bytes | Referenced Flag |
|---|---|---|---|---|
| 0 | | 19 | 28,500 | 0 |
| 1 | | 1001 | 1,501,500 | 1 |
| 2 | | 32,952 | 49,428,000 | 1 |
| 3 | | 87 | 130,500 | 0 |
| . . . | | | | |
| 16,381 | | 2001 | 300,150 | 1 |
| 16,382 | | 999 | 1,498,500 | 0 |
| 16,383 | | 1013 | 1,519,500 | 1 |

FIG. 5

| Entry | Misc. Columns | # of Packets | # of Bytes | Referenced Flag |
|---|---|---|---|---|
| 1 | | 1001 | 1,501,500 | 1 |
| 2 | | 32,952 | 49,428,000 | 1 |
| ... | | | | |
| 16,381 | | 2001 | 300,150 | 1 |
| 16,383 | | 1013 | 1,519,500 | 1 |
| -1 | | | | |

DMA Buffer for
pkt_count>1000

FIG. 6

| Entry | Misc. Columns | # of Packets | # of Bytes | Referenced Flag |
|---|---|---|---|---|
| 1 | | 1001 | 1,501,500 | 1 |
| 2 | | 32,952 | 49,428,000 | 1 |
| ... | | | | |
| 16,382 | | 999 | 1,498,500 | 0 |
| 16,383 | | 1013 | 1,519,500 | 1 |
| -1 | | | | |

DMA Buffer for
byte_count>1,000,000

FIG. 7

| Entry | Misc. Columns | # of Packets | # of Bytes | Referenced Flag |
|---|---|---|---|---|
| 1 | | 1001 | 1,501,500 | 1 |
| 2 | | 32,952 | 49,428,000 | 1 |
| ... | | | | |
| 16,383 | | 1013 | 1,519,500 | 1 |
| -1 | | | | |

DMA Buffer for
byte_count>1,000,000
and Referenced

METHOD AND SYSTEM FOR FILTERING FLOW TABLE COUNTERS

CROSS-REFERENCE TO RELATED APPLICATIONS

This application claims priority to provisional application No. 62/033,306, entitled "Method and System for Filtering Flow Table Counters," filed on Aug. 5, 2014, the disclosure of which is herein incorporated by reference herein in its entirety.

BACKGROUND

In conventional flow monitoring systems, the counter values of an entire flow table are transferred from a network interface controller to a memory of a trusted host. The trusted host, using trusted software such as a hypervisor or OS kernel, then reviews and scans the counter values of the entire flow table. Checking the counter values of an entire flow table (e.g. 16K entries) creates a lot of overhead and becomes a resource expensive operation. Thus, there is a need in the art to reduce the DMA, CPU, and memory system overheads associated with reviewing the counter values.

BRIEF SUMMARY

The present disclosure relates to a system and method for filtering flow table counter entries.

According to one example, the present disclosure describes a computer-implemented method that includes a network interface controller (NIC) receiving predicate logic from trusted host software. One or more processors of the NIC may then filter entries from one of a plurality of flow tables based on the predicate logic received from the trusted host software. A subset of entries from the flow table are identified and provided to a memory associated with the trusted host software.

The method may include clearing information from the flow table that satisfies the predicate logic received from the host software. The method may also include providing a referenced flag for each entry in the flow table to indicate that one or more counters in the entry have been changed. Accordingly, the method may provide a means to clear the referenced flag(s) in one or more flow table entries.

The method may include transferring a value indicating a total number of records in the subset of entries to a trusted host's memory. The value indicating a total number of records in the subset of entries may be stored in a register located on the network interface controller. Alternatively, the subset of entries may also include a sentinel value after the last record to indicate the end of the subset of entries. In some examples, the predicate logic provided by the trusted software may include a range of entries in the flow tables.

In another example, a non-transitory computer readable medium that includes instructions is described. The instructions include receiving predicate logic from host software and filtering the entries of a flow table based on the received predicate logic. The instructions also include identifying a subset of entries in flow table based on the received predicate logic. Finally, the instructions may include providing the subset of entries to a memory associated with the host software.

Another example describes a system that includes a first register that receives predicate logic from host software. The system also includes a processor that filters a flow table based on the predicate logic received from the host software to identify a subset of entries from the flow tables. In this regard, the system may also include a memory that receives the subset of entries identified by the processor. The memory may subsequently transfer the subset of entries identified by the processor to a memory associated with the host software.

The flow tables may include a referenced flag for each entry that is set when one or more counters in the entry are updated, and cleared when the entry is provided to the host. The system may also include a second register for storing the total number of records in the subset of entries. The second register may provide the total number of records to the trusted software.

BRIEF DESCRIPTION OF THE DRAWINGS

FIG. 3 illustrates an example of a flow table;

FIG. 5 illustrates a subset of entries of a flow table according to one example;

FIG. 6 shows a subset of entries of a flow table according to another example; and FIG. 7 shows another subset of entries of a flow table according to a different example.

DETAILED DESCRIPTION

According to the present disclosure, a system includes a host. The host includes at least one processor, at least one memory, trusted software (e.g. a hypervisor or an OS kernel), and a network interface controller (NIC). The NIC includes at least one processor, at least one memory, a plurality of flow tables, at least one predicate register, at least one control status register, and at least one buffer. The plurality of flow tables may include both transmission flow tables and receiving flow tables.

In operation, the trusted software may issue a table read request to the NIC. The table read request may include predicate logic that is stored in the predicate register of the NIC. For example, the predicate logic may be in the form of:

Is {packet-counter} > {threshold value}?

For example, is the value of the packet-counter for one or more entries in a particular flow table greater than a threshold value. For example, "what are the entries in a flow table whose packet counters values are greater than 1000 packets?"

In response to receiving the table read request, the at least one processor of the NIC may use the predicate logic to filter the counter entries. In this regard, the NIC may only transfer entries that meet the criteria specified by the trusted software. The entries that satisfy the criteria specified by the trusted software are then moved to a Direct Memory Access (DMA) buffer on the NIC to create a subset of entries. Once some or all of the flow table has been scanned, the subset of entries may be transferred from the DMA buffer on the NIC to a memory of the trusted host via a DMA transfer.

While the examples described herein refer to monitoring flow table entries, one of ordinary skill in the art would recognize that the methods and systems described herein would apply to network interface controllers that support protocol off-loading and include a routing table, a MAC-learning table, an ARP-table, etc. Examples such as the above-described tables would all benefit from the methods and systems described herein.

Figure 1:
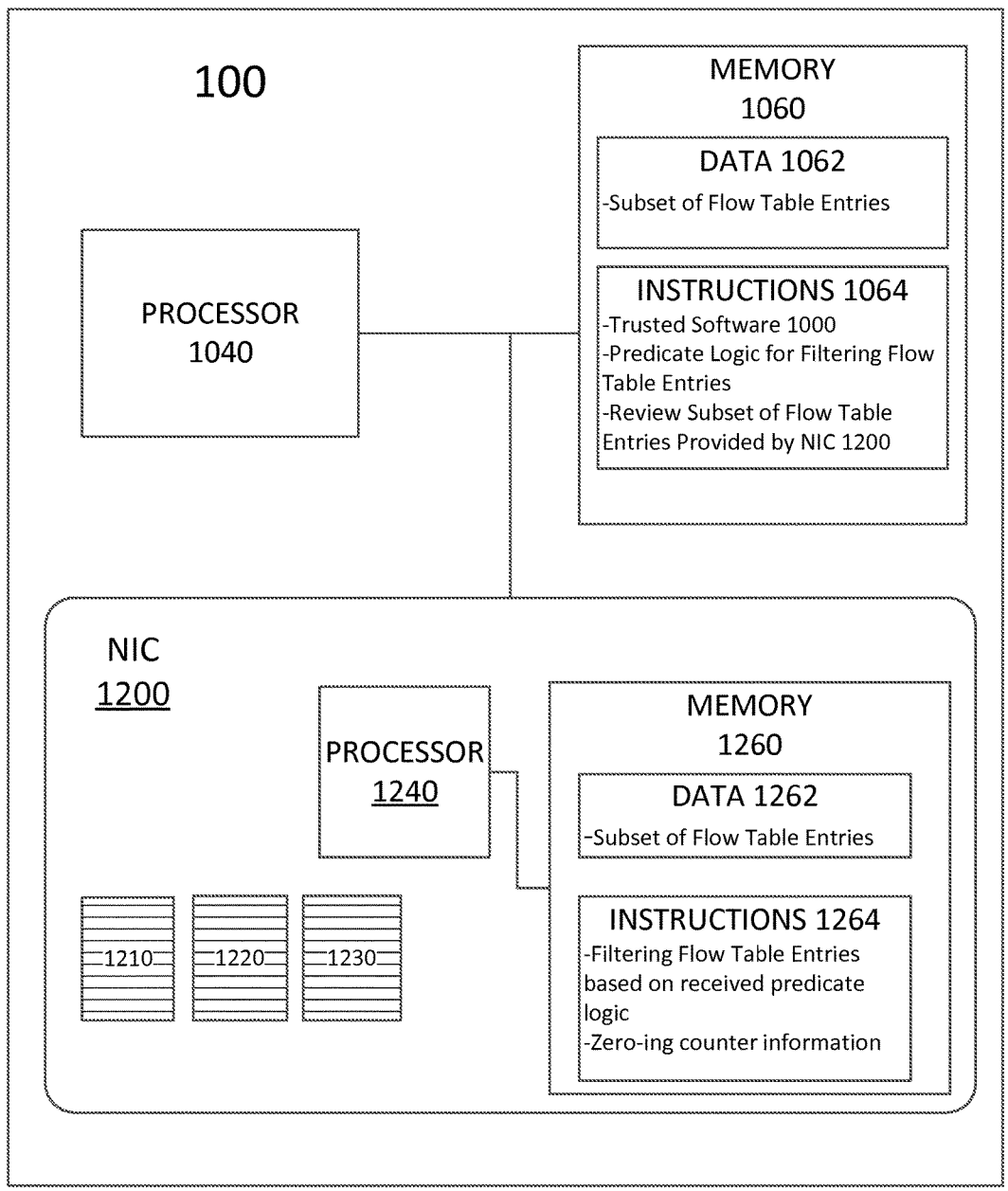
FIG. 1 is a schematic diagram of an example device according to one example.

Turning to FIG. 1, a device 100 according to one example is shown. The device 100 includes at least one processor 1040, at least one memory 1060, and a network interface controller (NIC) 1200. According to the examples described herein, the device 100 may be a trusted host that includes a plurality of virtual machines, or an unvirtualized host. However, one of ordinary skill in the art will recognize that device 100 may be a router, a switch, or any other suitable device capable of routing network traffic.

The processor 1040 of the device 100 may be any conventional processor, such as processors from Intel Corporation or Advanced Micro Devices. Alternatively, the processor may be a dedicated controller such as an application specific integrated circuit (ASIC), field programmable gate array (FPGA), etc. Additionally, the processor 1040 of the trusted host 100 may include multiple processors, multi-core processors, or any combination thereof. Accordingly, references to a processor will be understood to include references to a collection of processors or dedicated logic that may or may not operate in parallel.

The memory 1060 of the device 100 stores information accessible by the processor 1040, including instructions 1064 and data 1062 that may be executed or otherwise used by the processor 1040. The memory 1060 may also store the device 100's operating system and trusted software 1000. In this regard, the memory 1060 maybe of any type capable of storing information accessible by the processor, including a computer-readable medium, or other medium that stores data that may be read with the aid of an electronic device, such as a hard-drive, solid-state memory, memory card, flash drive, ROM, RAM, DRAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 1064 may be any set of instructions to be executed directly (such as machine code) or indirectly (such as scripts) by the processor 1040. For example, the instructions may be stored as computer code on the computer-readable medium. In this regard, the terms "instructions" and "programs" may be used interchangeably herein. The instructions may be stored in object code format for direct processing by the processor, or in any other computer language including scripts or collections of independent source code modules that are interpreted on demand or compiled in advance. The instructions 1064 may be executed to, for example, issue a table read request that includes a predicate logic, receive a subset of flow table entries from the NIC 1200, and review the subset of flow table entries, etc. Functions, methods and routines of the instructions are explained in further detail below.

The data 1062 may be retrieved, stored or modified by the processor 1040 in accordance with the instructions 1064. For instance, although the system and method are not limited by any particular data structure, the data may be stored in computer registers, in a relational database as a table having a plurality of different fields and records, XML documents or flat files. The data may also be formatted in any computer-readable format. The data may comprise any information sufficient to identify the relevant information, such as numbers, descriptive text, proprietary codes, references to data stored in other areas of the same memory or different memories (including other network locations) or information that is used by a function to calculate the relevant data.

The NIC 1200 includes at least one processor 1240; at least memory 1260; and a plurality of flow tables 1210, 1220, and 1230. The processor 1240 may be one of the processors discussed above or any combination thereof. In other examples, the processor 1240 may be fixed-function hardware configured to perform the examples described herein.

Additionally, the memory 1260 may be any type of memory previously discussed or any combination thereof. Similar to the memory 1060, the memory 1260 includes data 1262 and may include instructions 1264. The data 1262 may include a subset of flow table entries that are obtained by the processor 1240 filtering the flow table counters according to predicate logic received from the trusted software 1000. The instructions 1264 may be executed to, for example, receive predicate logic from the trusted software 1000, filter the flow table counters according to the received predicate logic, transmit the subset of flow table entries to the trust software 1000, and zero-out the flow table counters. Functions, methods and routines of the instructions 1264 are explained in further detail below.

The plurality of flow tables 1210, 1220, and 1230 may be any type of large hardware table capable of representing up to tens of thousands of flows. While three flow tables are shown in FIG. 1, one of ordinary skill in the art would recognize that more or fewer flow tables may be used. In a simple example, there may be two flow tables: a transmit flow table and a receive flow table. In the example of a trusted host with a plurality of virtual machines, the NIC 1200 may have one or more flow tables for each virtual machine, or for each Virtual Function of an SR-IOV NIC. Another example may describe a router or switch. In this example, a flow table may be dedicated to each port on the router or switch. One of ordinary skill in the art would appreciate the examples described herein are merely illustrative and should not be construed as limiting.

In some examples, the plurality of flow tables 1210, 1220, and 1230 may store up to 16K entries (e.g., 16,384 entries). One of ordinary skill in the art would recognize that fewer than the 16K entries may be actually used. Additionally, a skilled artisan would recognize that the plurality of flow tables may include up to 32K or 64K entries. The number of entries stored in the plurality of flow tables is merely illustrative, and one of ordinary skill in the art would appreciate that any number of entries may be used consistent with the examples described herein.

Figure 2:
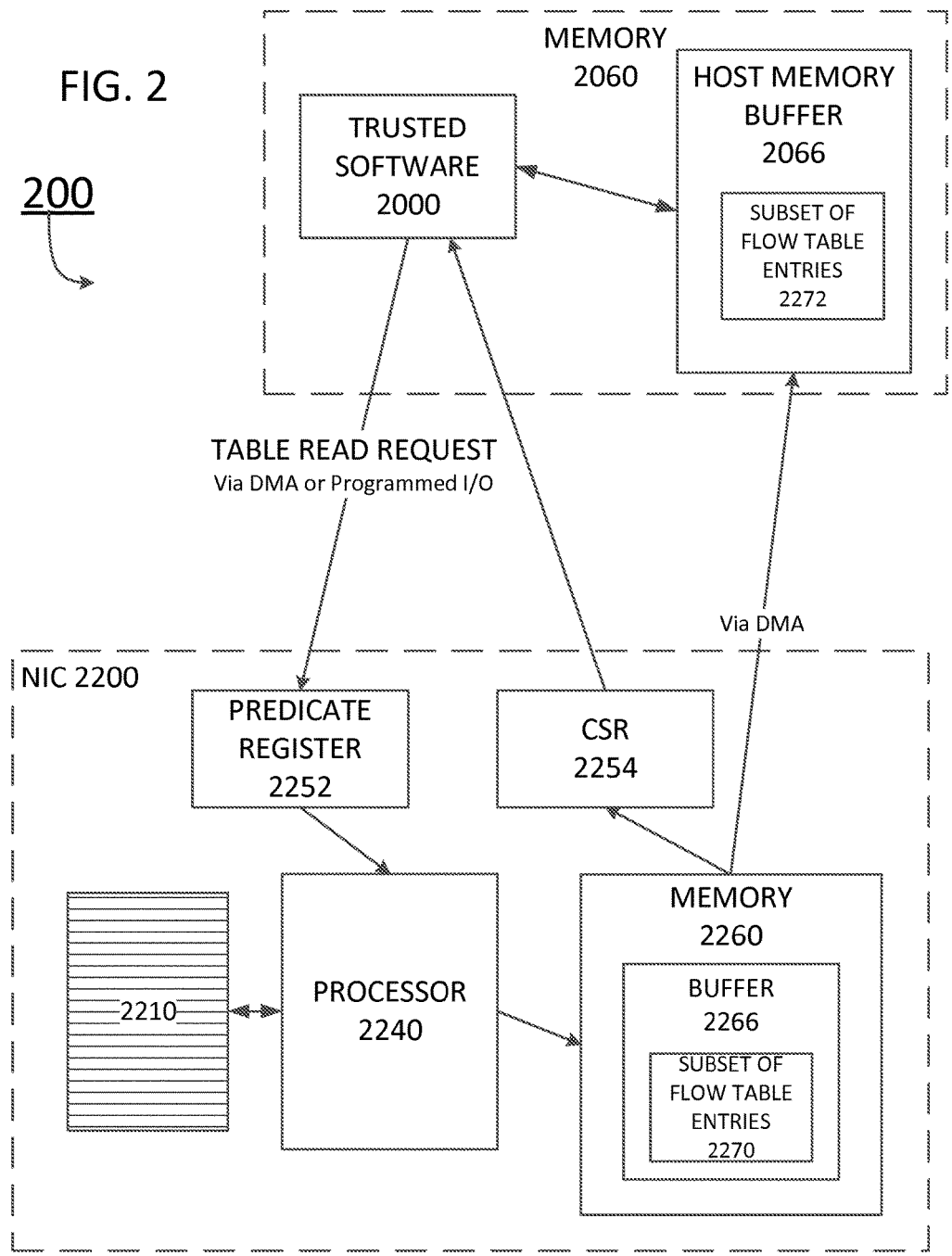
FIG. 2 illustrates a schematic diagram of a NIC filtering flow table entries in accordance with a table read request.

Turning to FIG. 2, an example of the interaction between the trusted software 2000 and the NIC 2200 is shown. As above with reference to FIG. 1, the device 200 includes memory 2060 and the NIC 2200.

The memory 2060 has the same structure as memory 1060 above and includes the trusted software 2000, such as a hypervisor or an OS kernel, and a host memory buffer 2066. The host memory buffer 2066 receives a subset of flow table entries 2272 from the NIC 2200.

The NIC 2200 includes at least the processor 2240, the memory 2260, the flow table 2210, a predicate register 2252, and a control status register 2254.

The processor 2240 may be any of the processors or fixed function hardware discussed above with respect to processor 1240 in FIG. 1. Additionally, the memory 2260 may be any of the memories discussed above with respect to the memory 1260.

The memory 2260 also includes a buffer 2266. The buffer 2266 may be a portion of the memory 2260 allocated to receiving a subset of flow table entries 2270. In some examples, the buffer 2266 may be a separate memory capable of storing the subset of flow table entries 2270. According to this example, the buffer 2266 is smaller than the maximum size of the flow table. Therefore, the NIC 2200 may start transferring the contents of buffer 2266 to the host memory buffer 2066 in parallel with (or interleaved with) the processor 2240's scanning of the flow table 2210. In some examples, the buffer 2266 may be twice as large as the preferred size for a DMA transfer, so that the NIC 2200 can double-buffer. Accordingly, the DMA transfers may be large enough to get maximum performance, but not so large as to lock out other DMAs for long periods.

The flow table 2210 may be any type of large hardware table capable of representing up to tens of thousands of flows. While only one flow table is shown, one of ordinary skill in the art would recognize that more or fewer flow tables may be used as described above.

The predicate register 2252 and the control status register (CSR) 2254 may be any type of register located on the NIC 2200. In alternative examples, the predicate register 2252 and the CSR 2254 may be registers located within the processor 2240. In some examples, the CSR register 2254 is used to store the total number of entries in the subset of entries 2270.

The predicate register 2252 stores predicate logic received from the trusted software 1000. The predicate logic may be in the form of:

Is {packet-counter, byte-counter} {>,<} {threshold value}?

Although the examples described herein refer to greater than (>) and less than (<), one of ordinary skill in the art would recognize that other operators may be used, such as "greater than or equal to" or "less than or equal to."

In operation, the predicate logic associated with the table read request may be "is byte-counter greater than 1,000 packets?" The predicate logic included in the table read request is stored in predicate register 2252. The processor 2240 receives the table read request and refers to the predicate register 2252 to determine the associated predicate logic. The processor 2240 may then scan the flow table 2210 according to the predicate logic stored in the predicate register 2252. According to this example, the processor 1240 is filtering flows that have carried more than 1000 packets.

The processor may also filter flow table entries based on the number of packets associated with that flow. When at least one flow table entry satisfies the received predicate logic, the subset of flow table entries 2270 is subsequently transferred to the host memory buffer 2066 via at least one DMA transfer. The subset of flow table entries 2272 stored in the host memory buffer 2066 may then be subjected to additional processing by the processor 2040 (not shown). However, when none of the flow table entries satisfy the predicate logic, the NIC may notify the trusted host software that the subset of flow table entries contains zero entries by either a DMA transfer or use of the CSR. By having the trusted software specify a predicate logic, the processing and memory overhead associated with tracking entries in a flow table is shifted from the trusted host to the NIC. This allows the trusted host to manage network traffic more quickly and efficiently.

In another example, the trusted software may issue a table read request with predicate logic "is packet-counter greater than 1,000,000 bytes?" As described above, the predicate logic included in the table read request is stored in predicate register 2252. The processor 2240 receives the table read request and refers to the predicate register 1252 to determine the associated predicate logic. The processor 2240 may then scan the flow table 2210 according to the predicate logic stored in the predicate register 1252. According to this example, the processor 1240 is filtering flows that have carried more than 1,000,000 bytes.

Figure 4:
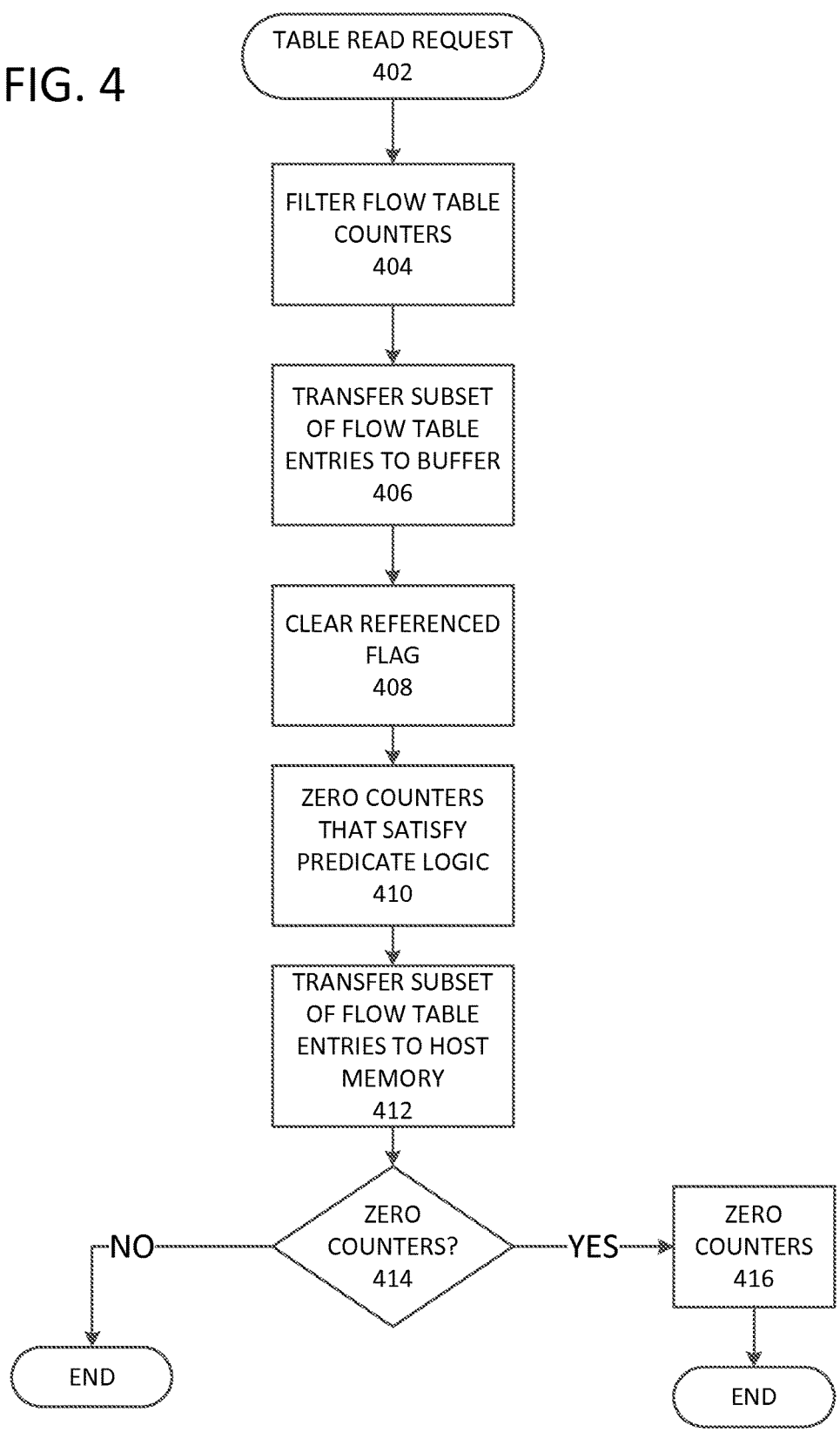
FIG. 4 shows a flowchart according to one example.

Referring to the flow table in FIG. 4, the processor may filter the flow table entries based on the number of bytes associated with that flow. The subset of flow table entries 2270 is then transferred to the host memory buffer 2066 via a DMA transfer. The subset of flow table entries 2272 stored in the host memory buffer 2066 may then be subjected to additional processing, for example, by the processor 2040 in FIG. 2.

In other examples, the predicate logic may include a subset of counters based on their index values (e.g., flow table entries 1300-10,000). Accordingly, the predicate logic may be in the form:

Is {packet-counter, byte-counter} {>, <} {threshold value} AND ({min_idx} counter-index {max_idx})?

The example is similar to the example described above with an additional feature. In this regard, "AND" represents a logical conjunction. Although "AND" is used in the above-described predicate, one of ordinary skill in the art would recognize that any logical conjunction could be used in its place. Further, "min_idx" stands for the lowest flow table entry to be indexed and "max_idx" may represent the highest flow table entry to be indexed. According to some examples, fewer than the total number of flow table entries may be used. In this example, "max_idx" may be set to flow table size (e.g. FT_SIZE) to reduce the processing time associated with going through every entry in the flow table.

In operation, the flow table may only have 15,000 entries (fewer than the total number of 16,384 entries possible). Alternatively, all of the entries may be used but the trusted software 1000 may want to limit the entries it uses to a certain number, and thereby avoid transferring unused table entries for a table read request. In this regard, the trusted software may issue a table read request with predicate logic as described above. However, the predicate logic may also include a range of flow table entries for which to apply the predicate logic.

Further examples describe using a referenced flag to indicate that the flow table entry has been used by the NIC. In this regard, the referenced flag may be used to limit the entries returned for a table read request to the subset that has been updated by the NIC since the previous table read request. For example, the predicate logic may be in the form:

Is {packet-counter, byte-counter} {>, <} {threshold value} [{AND, OR} [NOT] referenced]?

In operation, this predicate logic may be used, for example, to discover flows that have gone over 1,000,000 bytes since the previous table read request.

Returning to FIG. 2, the subset of flow table entries may be transferred to the host memory buffer 1066 from the buffer 2266. Accordingly the trusted software needs to know where the subset of entries ends in the memory 2260 of the device 200. According to one example, the trusted software 2000 may reserve space at the beginning of its memory region 2272 for a header structure, which may include at least one field that represents the total number of entries that match the predicate logic. The subset of entries, containing (M) entries, may then be transferred from the buffer 2266 to the memory region 2272 by at least one DMA transfer. Finally, the processor 2240 may create an instance of the header structure, which contains the value (M) in the header field designated for the number of matching entries, and transfers this header, via a DMA, to the reserved space in the memory region 2272. The processor may then notify the trusted host that the DMA transfer has been completed via an interrupt or other well-known mechanism for providing this kind of notification.

Another example to indicate the end of the subset of entries is to use a sentinel value (e.g., "−1"). For example, the sentinel value may be written after the last entry in the subset of entries 2272 to indicate the end of the subset of entries. Such a sentinel value is discussed in greater detail below. A further example may include writing the total number (M) of entries in the subset of entries to the CSR 2254. The trusted software may then access the CSR after the DMA transfer is complete to determine the total number of entries in the subset of entries.

Additionally, the NIC 2200 may need to know when to clear the information in the counters. Typically, the counter information is zeroed-out each time the entire set of counter information is read from the flow table. However, this creates an issue when only a subset of the counter information is read. In order to address this issue, one example may include zeroing out the counter information of the counters that meet the predicate logic. For example, the flow entries that satisfy the predicate logic may be zeroed-out. In this regard, counts that accumulate against each other are not lost.

Another example may be to include a zero-when-read flag that is set when the entry meets the predicate logic specified by the trusted software. Accordingly, the software may opt to "zero-out" or clear the entries where the zero-when-read flag is set in the table read request.

Referring to FIG. 3, an example of a flow table is shown. For example, FIG. 3 provides an example illustration of the flow tables 1210, 1220, and 1230 shown in FIG. 1. In this regard, the flow table is shown have an "Entry" field, "Misc. Columns" field, "No. of Packets" field, "No. of Bytes" field, and a "Referenced Flag" field. One of ordinary skill in the art would recognize that additional or fewer fields could be included in the flow table.

The "Entry" field may be any type of field used to index the entries in the flow table. As shown in FIG. 3, the entry field ascends numerically from 0 to the maximum entry. Accordingly, FIG. 3 shows the flow table having a maximum of 16,384 entries. However, one of ordinary skill in the art will recognize that the flow table may have 8K entries, 32K entries, or 64K entries. These numbers are merely illustrative. One of ordinary skill in the art would appreciate the range of entries the flow tables were capable of managing from the examples described herein. Moreover, one of ordinary skill in the art may recognize that the "Entry" field may be optional. That is, the flow tables may not include an "Entry" field.

The "Misc. Columns" field may include information that may be related to the flow. For example, the "Misc. Columns" field may represent several columns that may contain information related to the flow entry. For example, the "Misc. Columns" field may include the flow look-up key, the priority, quality-of-service, source-destination information, etc. associated with the flows. One of ordinary skill in the art would recognize the information that may be included in the "Misc. Columns" field and are not discussed in greater detailed herein.

The "No. of Packets" field may include the total number of packets associated with the flow. Accordingly, the "No. of Packets" may track the total number of packets transmitted and received with the flow. Alternatively, the "No. of Packets" field may track either the number of packets transmitted or the number of packets received. In these examples, the flow table entry may be related to a transmission flow, while a second flow table entry may be related to a receiving flow. Information about whether the flow table entry is a transmission flow or a receiving flow may be included in the "Misc. Columns" field described above.

The "No. of Bytes" field may include the total number of bytes associated with the flow. For example, the "No. of Bytes" field may track the total number of bytes transmitted and received by the flow. Alternatively, the "No. of Bytes" field may track either the number of bytes transmitted or the number of bytes received. As discussed above, information about whether the flow table entry is a transmission flow or a receiving flow may be included in the "Misc. Columns" field described above.

Recording the number of bytes may ensure that the flow and/or the parties associated with the flow are adhering to the terms-of-service, quality-of-service, or priority of the flow. One of ordinary skill in the art would recognize that the examples described herein are merely illustrative.

As discussed above, the "Referenced Flag" field may be optional. The "Referenced Flag" may be a bit or flag value that is set when the NIC updates a value in the flow entry.

Referring to FIG. 4, a flow chart for requesting flow table entries is shown. In block 402, the trusted software issues a table read request with predicate logic, via a DMA or a programmed I/O, to the NIC.

In block 404, the NIC may filter the flow table entries using the predicate logic received from the trusted host. For example, filtering flow table entries may include moving selected entries to a buffer or separate memory location. This reduces the trusted host's processing and memory overhead associated with tracking counter entries in a flow table. This also allows the trusted host to manage network traffic more quickly and efficiently.

In block 406, the NIC will transfer a subset of flow table entries to a buffer or separate memory located on the NIC.

In block 408, the referenced flag of the entries that satisfy the predicate logic is cleared, if requested by the trusted host. One of ordinary skill in the art would recognize that clearing the referenced flag may be omitted. According to these examples, the counters associated with the flow table entries that satisfy the predicate logic may be zeroed-out in block 410 via a flag included in the table read request. For example, if the predicate logic is looking for entries with more than a 1,000 packets, the field indicating the total number of packets may be set to zero (0) when the predicate logic is satisfied and the table read request includes the flag indicating that the entries are to be zeroed-out.

In block 412, the subset of flow table entries may be transferred to the device memory. This transfer may be a done via a Direct Memory Access (DMA) transfer. Alternatively, this transfer of flow table entries may be done via a Programmed I/O operation. In other examples, the NIC may start transferring the contents of the DMA buffer to the host memory buffer in parallel with (or interleaved with) the scanning of the flow table.

In block 414, the NIC may make a determination whether to "zero-out" or clear the counters. Alternatively, the trusted software may make the determination in block 414 and issue a command to the NIC to zero-out the counters according to one of the techniques described above. If the counters are not to be zeroed-out the method ends.

In block 416, the counters are zeroed-out or cleared according to one of the techniques described above, when it is determined that the counters are to be zeroed-out. As noted above, the trusted software may send a command to the NIC to clear the counter information. Alternatively, the NIC may make a determination that the counter information should be cleared. One of ordinary skill in the art would recognize that the counter information may be cleared according to a variety of techniques which are not discussed in greater detail herein.

Accordingly, the trusted software may specify a predicate logic that the NIC will use to filter counter entries in a flow table. This moves the logic out of the trusted host and onto the NIC, thereby reducing the processing and memory overhead associated with tracking counter entries in a flow table. This allows the trusted host to manage network traffic more quickly and efficiently.

Turning to FIG. 5, an example of a subset of flow table entries that have been filtered is shown. For example, the trusted software may provide predicate logic:

Is {packet-counter} > {1,000 packets}?

Using the predicate of flows with greater than 1000 packets, the NIC will scan a flow table as discussed above to determine flow table entries that have more than 1,000 packets and return a subset of the flow table entries that satisfy the parameters received from the trusted host. The subset of flow table entries shown in FIG. 5 illustrates flows that have more than 1,000 packets associated therewith. As such, entries {1, 2 . . . 16,381, 16,383} from FIG. 3 are included in the subset of flow table entries illustrated in FIG. 5. Referring to FIGS. 2 and 5, the subset of flow table entries illustrated in FIG. 5 is then transferred to the buffer 2266. This may be the number of packets transmitted, the number of packets received, or the total number of packets transmitted and received. Accordingly, the NIC scans the flow table and provides this subset of information to the trusted host via a DMA transfer.

FIG. 5 may include all of the columns described above with respect to FIG. 3. In preferred examples, the entry numbers must be included in the subset of flow table entries. In alternative examples, certain columns may be included or excluded in accordance with the NIC's design or an explicit request from the trusted host software. In this regard, the subset of flow table entries may include information that would help the trusted host device more efficiently manage flows. For example, information related to the source-destination pair or other information handled by the NIC may be provided to the trusted host.

Additionally, FIG. 5 illustrates the use of the sentinel value described above. For example, a sentinel value, such as "−1", may be included after last entry in the subset of flow table entries. The sentinel value may indicate the end of the subset of flow table entries to the trusted host. While a "−1" is illustrated, one of ordinary skill in the art would recognize that any value may be used to indicate the end of the subset of flow table entries. In alternative examples, the sentinel value may not be used. Instead, the NIC may write the total number of entries in the subset of flow table entries to a CSR that the trusted host may access after the subset of flow table entries has been transferred to the trusted host's memory.

Referring to FIG. 6, another example of a subset of flow table entries is shown. As described above, the subset of flow table entries shown in FIG. 6 illustrates those flows that have more than 1,000,000 bytes associated therewith.

According to this example, the trusted software may provide predicate logic:

Is {packet-counter} > {1,000,000 bytes}?

Using the predicate of flows with greater than 1,000,000 bytes, the NIC will scan a flow table to determine flow table entries that have more than 1,000,000 bytes. Accordingly, entries {1, 2 . . . 16,382, 16,383} from FIG. 3 are returned in the subset of flow table entries illustrated in FIG. 6. The total number of bytes may indicate the number of bytes transmitted or received. Accordingly, the table shown in FIG. 6 may represent the flow table entries that satisfy the predicate logic received from the trusted host.

Similar to the flow table shown in FIG. 5, FIG. 6 may include all of the columns described above. In alternative examples, fewer than all of the columns may be provided in the subset of flow table entries. The subset of flow table entries may include information that would help the trusted host device more efficiently manage flows. For example, information related to the flows' priority, quality of service, source-destination pair, etc. may be provided to the trusted host to make determinations with respect to managing the transmission/reception of data.

FIG. 6 also illustrates the use of the sentinel value described above. The sentinel value (e.g., "−1") may be used to indicate the last entry in the subset of flow table entries to the trusted host. While a "−1" is illustrated, one of ordinary skill in the art would recognize that any value may be used to indicate the end of the subset of flow table entries. In alternative examples, the sentinel value may not be used. Instead, the NIC may write the total number of entries in the subset of flow table entries to a CSR that the trusted host may access after the subset of flow table entries has been transferred to the trusted host's memory.

Turning to FIG. 7, another example of a subset of flow table entries is shown. The subset of flow table entries illustrated in FIG. 7 illustrates those flows that have more than 1,000,000 bytes associated therewith and has a Referenced Flag set.

According to this example, the trusted software may provide predicate logic:

Is {packet-counter} > {1,000,000 bytes} AND {referenced}?

Using the predicate above, the NIC will scan a flow table to determine flow table entries that have more than 1,000,000 bytes and a Referenced Flag set. Accordingly, entries {1, 2 . . . 16,383} from FIG. 3 are returned in the subset of flow table entries illustrated in FIG. 7. The total number of bytes may indicate the number of bytes transmitted or received. Accordingly, the table shown in FIG. 7 may represent the flow table entries that satisfy the predicate logic received from the trusted host.

As noted above, FIG. 7 may include all of the columns described above. In alternative examples, fewer than all of the columns may be provided in the subset of flow table entries. The subset of flow table entries may include information that would help the trusted host device more efficiently manage flows. For example, information related to the flows' priority, quality of service, source-destination pair, etc. may be provided to the trusted host to make determinations with respect to managing the transmission/reception of data.

FIG. 7 also shows the use of the sentinel value described above. The sentinel value (e.g., "−1") may be used to indicate the last entry in the subset of flow table entries to the trusted host. While a "−1" is illustrated, one of ordinary skill in the art would recognize that any value may be used to indicate the end of the subset of flow table entries. In alternative examples, the sentinel value may not be used. Instead, the NIC may write the total number of entries in the subset of flow table entries to a CSR that the trusted host may access after the subset of flow table entries has been transferred to the trusted host's memory.

According to the examples discussed above, the trusted software may specify a predicate logic that the NIC will use to filter counter entries in a flow table. This moves the logic from the trusted host and onto the NIC, thereby reducing the processing and memory overhead associated with tracking counter entries in a flow table. This allows the trusted host to manage network traffic more quickly and efficiently.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer-implemented method comprising:
   receiving predicate logic from host software;
   filtering, using one or more processors associated with a network interface controller residing on a same device as the host software, at least one of a plurality of flow tables based on the predicate logic received from the host software, wherein the predicate logic includes a range of entries in at least one the plurality of flow tables;
   identifying, based on the filtering, a subset of entries from the at least one of the plurality of flow tables; and
   providing, using the one or more processors, the subset of entries to a memory associated with the host software.

2. The method of claim 1, further comprising:
   clearing information from the at least one of the plurality of flow tables that satisfy the predicate logic received from the host software.

3. The method of claim 1, further comprising:
   transferring a value indicating a total number of records in the subset of entries to the memory associated with the host software.

4. The method of claim 1, wherein the subset of entries includes a sentinel value after a last record to indicate the end of the subset of entries.

5. The method of claim 1, further comprising:
   transferring a value indicating a total number of records in the subset of entries from a register of the network interface controller.

6. A non-transitory computer readable medium storing instructions that, when executed by one or more processors, perform a method comprising:
   receiving predicate logic from host software;
   filtering, using one or more processors associated with a network interface controller residing on a same device as the host software, at least one of a plurality of flow tables based on the predicate logic received from the host software, wherein the predicate logic includes a range of entries in the at least one of the plurality of flow tables;
   identifying, based on the filtering, a subset of entries from the at least one of the plurality of flow tables; and
   providing, using the one or more processors, the subset of entries to a memory associated with the host software.

7. The non-transitory computer readable medium of claim 6, the method further comprising clearing information from the at least one of the plurality of flow tables that satisfy the predicate logic received from the host software.

8. The non-transitory computer readable medium of claim 6, the method further comprising transferring a value indicating a total number of records in the subset of entries to the memory associated with the host software.

9. The non-transitory computer readable medium of claim 6, wherein the subset of entries includes a sentinel value after a last record to indicate the end of the subset of entries.

10. The non-transitory computer readable medium of claim 6, the method further comprising transferring a value indicating a total number of records in the subset of entries from a register of the network interface controller.

11. A system comprising:
    a first register adapted to receive predicate logic from host software;
    at least one processor in communication with the first register, the at least one processor programmed to:
       filter at least one of a plurality of flow tables based on the predicate logic received from the host software; and
       identify, based on the filtering, a subset of entries from the at least one of the plurality of flow tables; and
    a first memory in communication with the at least one processor, the first memory being adapted to receive the subset of entries identified by the at least one processor and provide a second memory associated with the host software with the subset of entries.

12. The system of claim 11, further comprising:
    a second register in communication with the at least one processor, the second register storing a value indicating a total number of records in the subset of entries.

13. The system of claim 12, wherein the second register is accessible by at least one host processor to obtain the value indicating a total number of records in the subset of entries.

14. A computer-implemented method comprising:
    receiving predicate logic from host software;
    filtering, using one or more processors associated with a network interface controller residing on a same device as the host software, at least one of a plurality of flow tables based on the predicate logic received from the host software;
    identifying, based on the filtering, a subset of entries from the at least one of the plurality of flow tables, wherein the subset of entries includes a sentinel value after a last record to indicate the end of the subset of entries; and
    providing, using the one or more processors, the subset of entries to a memory associated with the host software.

15. The method of claim 14, further comprising:
    clearing information from the at least one of the plurality of flow tables that satisfy the predicate logic received from the host software.

16. The method of claim 14, further comprising:
    transferring a value indicating a total number of records in the subset of entries to the memory associated with the host software.

17. The method of claim 14, further comprising:
    transferring a value indicating a total number of records in the subset of entries from a register of the network interface controller.

18. A non-transitory computer readable medium storing instructions that, when executed by one or more processors, perform a method comprising:
    receiving predicate logic from host software;

filtering, using one or more processors associated with a network interface controller residing on a same device as the host software, at least one of a plurality of flow tables based on the predicate logic received from the host software;

identifying, based on the filtering, a subset of entries from the at least one of the plurality of flow tables, wherein the subset of entries includes a sentinel value after a last record to indicate the end of the subset of entries; and providing, using the one or more processors, the subset of entries to a memory associated with the host software.

19. The non-transitory computer readable medium of claim 18, the method further comprising clearing information from the at least one of the plurality of flow tables that satisfy the predicate logic received from the host software.

20. The non-transitory computer readable medium of claim 18, the method further comprising transferring a value indicating a total number of records in the subset of entries to the memory associated with the host software.

21. The non-transitory computer readable medium of claim 18, the method further comprising transferring a value indicating a total number of records in the subset of entries from a register of the network interface controller.

\* \* \* \* \*